(12) United States Patent
Cho et al.

(10) Patent No.: US 8,824,421 B2
(45) Date of Patent: Sep. 2, 2014

(54) METHOD AND APPARATUS FOR TRANSMITTING/RECEIVING RESOURCE ALLOCATION INFORMATION IN A WIRELESS COMMUNICATION SYSTEM

(75) Inventors: Hee Jeong Cho, Anyang-si (KR); Ki Seon Ryu, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 13/322,406

(22) PCT Filed: May 25, 2010

(86) PCT No.: PCT/KR2010/003289
§ 371 (c)(1), (2), (4) Date: Nov. 23, 2011

(87) PCT Pub. No.: WO2010/137847
PCT Pub. Date: Dec. 2, 2010

(65) Prior Publication Data
US 2012/0063423 A1 Mar. 15, 2012

Related U.S. Application Data

(60) Provisional application No. 61/180,924, filed on May 25, 2009, provisional application No. 61/239,015, (Continued)

(30) Foreign Application Priority Data

May 25, 2010 (KR) ........................ 10-2010-0048425

(51) Int. Cl.
*H04W 72/04* (2009.01)
*H04B 7/216* (2006.01)
*H04W 74/08* (2009.01)
*H04W 74/00* (2009.01)
*H04B 7/26* (2006.01)

(52) U.S. Cl.
CPC ........ *H04W 72/042* (2013.01); *H04W 74/0833* (2013.01); *H04W 74/006* (2013.01); *H04B 7/2628* (2013.01)
USPC ........................................................ 370/335

(58) Field of Classification Search
CPC .......... H04W 72/042; H04W 72/0413; H04W 74/0833; H04W 74/006; H04B 7/2628; H04B 2201/70701; H04B 2201/70702; H04B 2201/70718
USPC ........................................................ 370/335
See application file for complete search history.

(56) References Cited

U.S. PATENT DOCUMENTS 7,313,123 B2 12/2007 Haartsen
2008/0139216 A1 6/2008 Lee et al.
(Continued)

FOREIGN PATENT DOCUMENTS

CN 101425847 A 5/2009
JP 2009-111505 A 5/2009
(Continued)

OTHER PUBLICATIONS

Cho et al., "Design of the CDMA Allocation A-MAP IE for Bandwidth Request Procedure", IEEE C802.16m-09/1067, Apr. 30, 2009, 7 pages.
(Continued)

*Primary Examiner* — Min Jung
(74) *Attorney, Agent, or Firm* — Birch, Stewart, Kolasch & Birch, LLP (57) ABSTRACT

The present invention relates to a method and apparatus for transmitting/receiving resource allocation information in a random access process in a wireless communication system. The method for transmitting/receiving resource allocation information in a random access process in a wireless communication system, according to one aspect of the present invention, involves a base station receiving a code from a terminal, and transmitting, to the terminal, CDMA Allocation A-MAP IE (code division multiple access allocation Advanced-MAP information element) including a field which indicates whether it is a source allocation for a bandwidth request or a resource allocation for ranging.

16 Claims, 3 Drawing Sheets

Related U.S. Application Data filed on Sep. 1, 2009, provisional application No. 61/243,159, filed on Sep. 17, 2009, provisional application No. 61/249,604, filed on Oct. 8, 2009, provisional application No. 61/250,873, filed on Oct. 13, 2009, provisional application No. 61/253,822, filed on Oct. 21, 2009, provisional application No. 61/257,848, filed on Nov. 4, 2009, provisional application No. 61/258,216, filed on Nov. 5, 2009.

(56) References Cited

U.S. PATENT DOCUMENTS

| | | |
|---|---|---|
| 2008/0181168 A1 | 7/2008 | Han et al. |
| 2008/0232330 A1 | 9/2008 | Lee et al. |
| 2009/0109920 A1 | 4/2009 | Suga |
| 2009/0116436 A1 | 5/2009 | Okuda |
| 2009/0223295 A1 | 9/2009 | Kondo |
| 2010/0202373 A1* | 8/2010 | Chun et al. ............. 370/329 |
| 2010/0254336 A1* | 10/2010 | Lee et al. ............. 370/329 |
| 2011/0051848 A1* | 3/2011 | Yuk et al. ............. 375/316 |
| 2011/0299495 A1* | 12/2011 | Choi et al. ............. 370/329 |
| 2012/0026965 A1* | 2/2012 | Cho et al. ............. 370/329 |
| 2012/0064854 A1* | 3/2012 | Youn et al. ............. 455/404.1 |

FOREIGN PATENT DOCUMENTS

| | | |
|---|---|---|
| KR | 10-2007-0036004 A | 4/2007 |
| KR | 10-0838534 B1 | 6/2008 |
| KR | 10-2008-0070153 A | 7/2008 |
| KR | 10-0853697 B1 | 8/2008 |
| WO | WO 2008/105291 A1 | 9/2008 |

OTHER PUBLICATIONS

Yang et al., "Text proposal on CDMA IE Allocation (AWD 15.2.11.2)", IEEE 802.16 Broadband Wireless Access Working Group, IEEE C802.16M-09/2061, Aug. 29, 2009, pp. 1-3.

Roshni Srinivasan, et al., Proposed changes to the DL and UL basic assignment A-MAP information elements in the 802.16m AWD, IEEE C802.16m-09/0766r1, Apr. 2009.

* cited by examiner

FIG. 1

Prior Art

FIG. 2

METHOD AND APPARATUS FOR TRANSMITTING/RECEIVING RESOURCE ALLOCATION INFORMATION IN A WIRELESS COMMUNICATION SYSTEM

CROSS REFERENCE TO RELATED APPLICATIONS

This application is a National Phase application of PCT/KR2010/003289 filed on May 25, 2010, which claims the benefit under 35 U.S.C. §119(e) of U.S. Provisional Application No. 61/180,924 filed on May 25, 2009, U.S. Provisional Application No. 61/239,015 filed on Sep. 1, 2009, U.S. Provisional Application No. 61/243,159 filed on Sep. 17, 2009, U.S. Provisional Application No. 61/249,604 filed on Oct. 8, 2009, U.S. Provisional Application No. 61/250,873 filed on Oct. 13, 2009, U.S. Provisional Application No. 61/253,822 filed on Oct. 21, 2009, U.S. Provisional Application No. 61/257,848 filed on Nov. 4, 2009, U.S. Provisional Application No. 61/258,216 filed on Nov. 5, 2009, and under 35 U.S.C. §119(a) to Patent Application No. 10-2010-0048425 filed in the Republic of Korea, on May 25, 2010. The entire contents of all of the above applications are hereby incorporated by reference.

TECHNICAL FIELD

The present invention relates to a wireless communication system, and more particularly, to a method and apparatus for transmitting/receiving resource allocation information in the course of a random access process in a wireless communication system.

BACKGROUND ART

Figure 1:
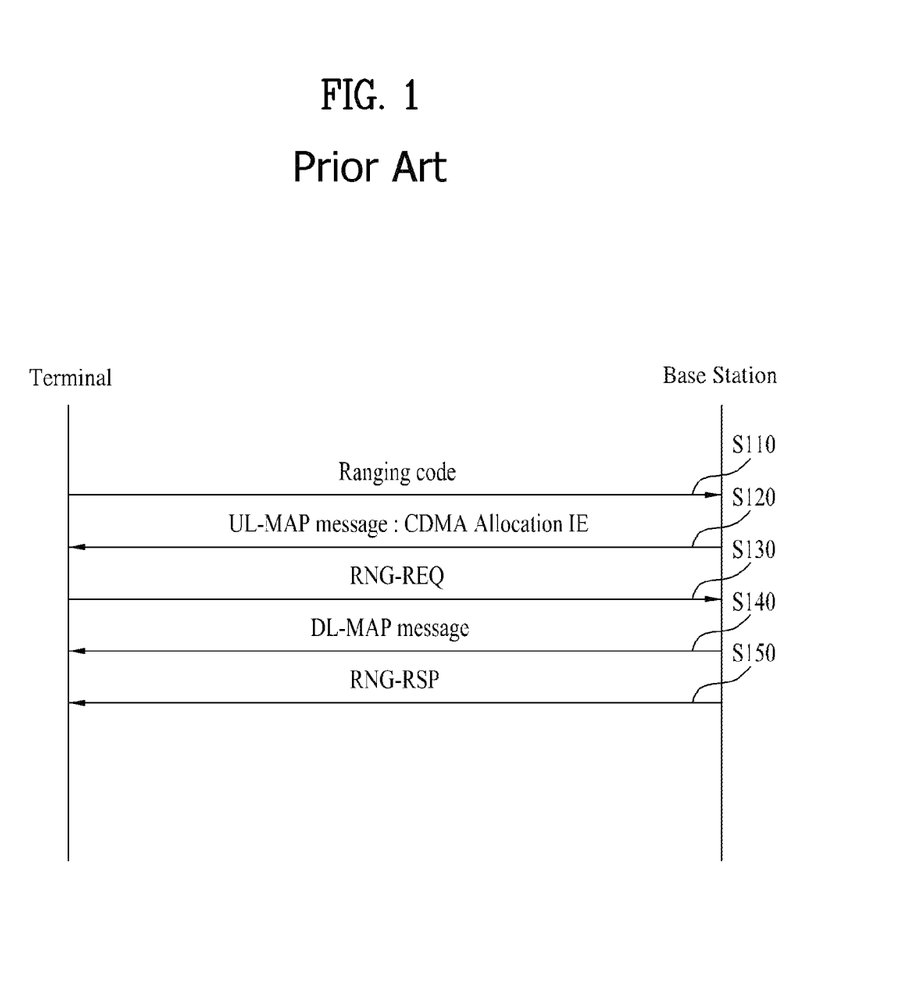
FIG. 1 is a diagram for a ranging procedure according to a related art.

First of all, a ranging procedure according to a related art is described with reference to FIG. 1. FIG. 1 is a diagram for a ranging procedure according to a related art.

A terminal performs a ranging procedure in case of attempting an initial access or making a handover. Referring to FIG. 1, a terminal transmits a ranging code to a base station [S110]. Having received the ranging code, the base station allocates an uplink (UL) resource by transmitting a CDMA allocation IE (information element) to the terminal via an uplink-MPA (hereinafter abbreviated UL-MAP) viewable to all terminals [S120].

The terminal sends a ranging request (hereinafter abbreviated RNG-REQ) message via an allocated UL resource region [S130]. In case that the terminal performs a ranging procedure for an initial access, the terminal delivers the RNG-REQ message with a connection ID (hereinafter abbreviated CID) for the initial ranging.

Having received the RNG-REQ message, the base station allocates a DL resource to carry a ranging response (hereinafter abbreviated RNG-RSP) message via a downlink-MAP (hereinafter abbreviated DL-MAP) viewable to all terminals [S140]. The base station then delivers the RNG-RSP message via the allocated DL resource [S150]. In case that the terminal performs a ranging procedure for an initial access, the base station delivers the RNG-RSP message for the initial ranging.

Regarding a bandwidth request procedure according to a related art, if a terminal transmits a bandwidth request (BR) code too a base station, the base station allocates a UL resource via CDMA allocation UL-MAP IE. If so, the terminal sends a bandwidth request message via the allocated UL resource. Having received the bandwidth request message, the base station allocates a UL resource to the terminal. The terminal then transmits data via the allocated UL resource.

In particular, in a ranging procedure and a bandwidth request procedure, a terminal transmits a code to a base station. Having received the code, the base station allocates a UL resource via CDMA allocation UL-MAP IE.

Table 1 shows a format of CDMA allocation UL-MAP IE according to a related art.

TABLE 1

| Syntax | Size (bit) | Notes |
|---|---|---|
| CDMA_Allocation_IE( ) { | — | — |
| Duration | 6 | — |
| UTUC | 4 | UTUC for transmission |
| Repetition Coding Indication | 2 | 0b00: No repetition coding<br>0b01: Repetition coding of 2 used<br>0b10: Repetition coding of 4 used<br>0b11: Repetition coding of 6 used |
| Frame Number Index | 4 | LSBs of relevant frame number |
| Ranging Code | 8 | — |
| Ranging Symbol | 8 | — |
| Ranging subchannel | 7 | — |
| BW request mandatory | 1 | 1: Yes<br>0: No |
| } | — | — |

According to a related art, each of all terminal having attempted the ranging checks RNG-RSP message and may be then able to aware whether the corresponding message has been sent to the corresponding terminal.

A terminal checks whether RNG-RSP message has been set to itself through an index of a ranging code contained in the RNG-RSP message and information on a timing point of transmitting the ranging code. Subsequently, the terminal ignores the RNG-RSP message if the RNG-message is not sent to the corresponding terminal.

Thus, the related art has a problem that the corresponding terminal should decode the RNG-RSP message unnecessarily.

In 802.16m system, a bandwidth request channel and a ranging are designed in different forms, respectively. Hence, a case for a base station to receive a ranging code differs from a case for the base station to receive a bandwidth request code in information supposed to be sent to a terminal.

Therefore, CDMA allocation IE in 802.16m system needs to contain proper information and also needs to be designed to be suitable for a basic A-MAP IE form of the 802.16m system.

DISCLOSURE OF THE INVENTION

Technical Problem

However, according to a related art, a terminal needs to perform unnecessary decoding. And, CDMA allocation IE suitable for 802.16m system is necessary.

Accordingly, an object of the present invention is to propose a structure of CDMA allocation IE suitable for 802.16m system.

Another object of the present invention is to provide an efficient resource allocation information transmitting/receiving method in a random access process.

Technical tasks obtainable from the present invention are non-limited by the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of transmitting resource allocation information, which is transmitted by a base station in a random access process in a wireless communication system, according to one embodiment of the present invention may include the steps of receiving a code from a terminal and transmitting CDMA (code division multiple access) Allocation A-MAP (Advanced-MAP) IE (information element) including a field indicating whether to allocate a resource for a bandwidth request or a resource for a ranging to the terminal.

To further achieve these and other advantages and in accordance with the purpose of the present invention, a method of receiving resource allocation information, which is received by a terminal in a random access process in a wireless communication system, according to another embodiment of the present invention may include the steps of transmitting a code to a base station and receiving CDMA (code division multiple access) Allocation A-MAP (Advanced-MAP) IE (information element) including a field indicating whether to allocate a resource for a bandwidth request or a resource for a ranging from the base station.

Preferably, if the code is a ranging code, the CDMA Allocation A-MAP IE may further include a field indicating whether the CDMA Allocation A-MAP IE allocates an uplink resource or a downlink resource.

Preferably, if the code is a bandwidth request code, the CDMA Allocation A-MAP IE may not include a field indicating an offset used to calculate a burst size. If the code is a ranging code, the CDMA Allocation A-MAP IE may include the field indicating the offset.

Preferably, the CDMA Allocation A-MAP IE may further include a field indicating the number of subframe(s) across which the allocated resource is distributed.

Preferably, the CDMA Allocation A-MAP IE may include a CRC masked with an RAID and a masking indicator and the RAID may be determined in accordance with an index of the code and a resource having carried the code.

To further achieve these and other advantages and in accordance with the purpose of the present invention, a terminal according to another embodiment of the present invention may include a transmitting module transmitting a code to a base station to attempt a random access and a receiving module receiving CDMA (code division multiple access) Allocation A-MAP (Advanced-MAP) IE (information element) including a field indicating whether to allocate a resource for a bandwidth request or a resource for a ranging from the base station.

To further achieve these and other advantages and in accordance with the purpose of the present invention, a base station according to a further embodiment of the present invention may include a receiving module receiving a code from a terminal attempting a random access and a transmitting module transmitting CDMA (code division multiple access) Allocation A-MAP (Advanced-MAP) IE (information element) including a field indicating whether to allocate a resource for a bandwidth request or a resource for a ranging to the terminal.

Effects of the Invention

According to embodiments of the present invention, resource allocation information may be efficiently transmitted to a terminal in a random access process.

Effects obtainable from the present invention are non-limited by the above mentioned effects. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE-A system (or terminal), the following descriptions may be applicable to other random mobile communication systems except unique features of the 3GPP LTE-A system (or terminal).

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Moreover, in the following description, assume that a terminal is a common name of such a mobile or fixed user stage device as a user equipment (UE), a mobile station (MS), a relay node as a downlink reception subject and the like. And, assume that a base station is a common name of such a random node of a network stage communicating with a terminal as a Node B (NB), an eNode B (eNB), a base station (BS), a relay node as a downlink reception subject and the like.

Explained in the following description are the fields that can be included in CDMA allocation A-MAP (advanced-MAP) IE (information element) transmitted by a base station having received a bandwidth request code or a ranging code in a random access process to allocate a resource to a terminal according to an embodiment of the present invention.

First of all, CDMA Allocation A-MAP IE may include resource allocation information, HARQ (hybrid automatic repeat request) related information, random access property, information on power control and the like.

Regarding the resource allocation information, CDMA Allocation A-MAP IE may be able to include a resource unit type field, a location field, an allocation size field, a modulation coding scheme (hereinafter abbreviated MCS) field, a long TTI field and an allocation relevance field.

The resource unit type filed may indicate whether an allocated resource corresponds to a distributed resource unit (hereinafter abbreviated DRU) or a continued resource unit (hereinafter abbreviated CRU).

The location field indicates a start point of an allocated resource. And, the allocation size field indicates a size of an allocated resource.

The MCS field indicates a modulation coding scheme and should be constructed with 4 bits to represent all possible MCS. Yet, it may be able to reduce the bits of the MCS field by enabling the MCS field to represent the MCS in part. And, the MCS field may be represented as a value of $I_{sizeoffset}$. In this case, the $I_{sizeoffset}$ is an offset value used to calculate a burst size index. And, it may be able to estimate MCS using the $I_{sizeoffset}$ and an allocation size. Hence, if a base station informs a terminal of $I_{sizeoffset}$ via CDMA Allocation A-MAP IE, the terminal can be aware of MCS.

The long TTI field indicates the number of subframes across which an allocated resource is situated. In particular, if the long TTI field is set to 0b0, it may mean that an allocated resource is situated across one subframe. If the long TTI field is set to 0b1, it may mean that an allocated resource is situated across 4 UL subframes in FDD (frequency division duplex) or that an allocated resource is situated across all UL subframes of a frame in TDD (time division duplex).

If the number of subframe(s) across which a resource allocated via CDMA Allocation A-MAP IE is set to 1 or an arbitrary value in advance, it may not be necessary to transmit the long TTI field.

A bandwidth request message or a ranging request message is the message sent by a terminal in a random access process. Yet, it may be more efficient for terminals performing a random access in aspect of cell coverage if a resource is allocated on a time axis rather than a frequency axis. In particular, allocating 3 logical resource units (hereinafter abbreviated LRUs) on a time axis is more efficient that allocating 3 LRUs on a frequency axis.

A terminal attempting a random access is unable to know a location and may be situated at an edge of a cell. Hence, the terminal attempting the random access should transmit a signal with high transmission power. Yet, since the terminal has a limited maximum power, if it transmits 3 LRUs at one timing point, a signal of each of the LRUs may be transmitted with ⅓ of the transmission power of the terminal. Yet, if one LRU is transmitted in each of 3 subframes, it may be able to transmit a signal of LRU with a maximum transmission power of a terminal at each timing point.

Therefore, such A-MAP IE, which allocates a resource, as BR (bandwidth request acknowledgement) A-MAP IE, CDMA Allocation A-MAP IE and the like may be able to include a long TTI indicator to inform a terminal whether a resource is allocated on a time axis.

The allocation relevance field is a subframe index in accordance with a ratio of DL subframe to UL subframe and may indicate whether A-MP region occurs in each 2 subframes or in each subframe. If an allocation relevance to CDMA allocation is defined as a specific subframe in advance, it may not necessary to transmit the allocation relevance field.

In association with HARQ related information, CDMA allocation IE may be able to include HFA field and ACID field.

The HFA field indicates a resource to transmit HARQ feedback. If ACK channel for a data transmission is mapped by a specific rule, it may be unnecessary to transmit the HFA field.

The ACID field indicates HARQ channel identifier. If the ACID field is omitted, a terminal may recognize a random value and operate. In this case, the random value may be usable in a manner of being defined as a first value (0b000) or a last value (0b111) of an available ACID in advance. A base station does not assign ACID of a corresponding usage to a general data transmission. ACID for a general data transmission may be assigned via UL basic assignment A-MAP IE.

Regarding the random access property, there are a BR or ranging code transmitted by a terminal and a resource that carries a BR or ranging code. The BR code may be substituted with a BR sequence or a BR indicator and the ranging code may be substituted with a ranging sequence or a ranging indicator. And, the resource carrying the code may be represented as a transmission opportunity of the code transmission, a subframe index, a frame index or the like.

In association with power control information, the CDMA Allocation A-MAP IE may be able to include a power level adjust field.

And, the CDMA Allocation A-MAP IE according to an embodiment of the present invention may include A-MAP IE Type field and MCRC.

The A-MAP IE Type field may indicate a type of A-MAP IE.

The MCRC is a CRC masked with an index of a code transmitted by a terminal, an RAID generated in accordance with the same random access property of a resource carrying a code transmitted by the terminal and a masking indicator. The masking indicator is 1-bit indicator that indicates whether the CRC is masked with RAID or STID. Hence, a terminal receives CDMA Allocation A-MAP IE and may be then able to check whether the CDMA Allocation A-MAP IE is transmitted to the corresponding terminal via the MCRC.

In the following description, CDMA Allocation A-MAP IE according to a $1^{st}$ embodiment of the present invention is explained.

First of all, CDMA Allocation A-MAP IE according to a $1^{st}$ embodiment of the present invention may include UL allocation information on one BR or ranging code received by a base station.

Table 2 shows a format of CDMA Allocation A-MAP IE according to a $1^{st}$ embodiment of the present invention.

TABLE 2

| Fields | Bit size (Example) |
|---|---|
| CDMA Allocation A-MAP IE( ) { | |
| A-MAP Type | 4 |
| if MCRC is masked with RAID and masking indicator for BR { | |
| Resource Index | 11 |
| Long TTI Indicator | 1 |
| $I_{sizeoffset}$ | 0~5 |
| HFA | 3 |
| Power Level Adjust | 4 |
| } | |
| Else if MCRC is masked with RAID and masking indicator for Ranging { | |
| Resource Index | 11 |
| Long TTI Indicator | 1 |
| $I_{sizeoffset}$ | 5 |
| HFA | 3 |
| ACID | 0~3 |
| Allocation relevance | 0~2 |
| } | |
| MCRC | |
| } | 16 |

Referring to Table 2, if CDMA Allocation A-MAP IE according to a $1^{st}$ embodiment of the present invention is CDMA Allocation A-MAP IE for BR code, it may include Resource index field, long TTI indicator field, $I_{sizeoffset}$ field, HFA field and Power level adjust field. If CDMA Allocation A-MAP IE according to a $1^{st}$ embodiment of the present invention is CDMA Allocation A-MAP IE for a ranging code, it may include Resource index filed, long TTI indicator field, $I_{sizeoffset}$ field, HFA field, ACID field and Allocation relevance field.

If the CDMA Allocation A-MAP IE is the CDMA Allocation A-MAP IE for the BR code, since it means that a resource required for a transmission of BR header having a fixed size, a terminal may be able to implicitly know MCS (modulation and coding scheme) using Resource Index and long TTI indicator without being explicitly informed of $I_{sizeoffset}$. Hence, if the CDMA Allocation A-MAP IE is the CDMA Allocation A-MAP IE for the BR code, it may not include the $I_{sizeoffset}$ field. On the other hand, if the CDMA Allocation A-MAP IE is the CDMA Allocation A-MAP IE for the ranging code, since a burst size is not fixed, the CDMA Allocation A-MAP IE should include the $I_{sizeoffset}$ field.

Since A-MAP Type field includes 4 bits and MCRC includes 16 bits, as shown in Table 2, the CDMA Allocation A-MAP IE according to the $1^{st}$ embodiment of the present invention may include minimum 40 bits to maximum 45 bits. Hence, assuming that a maximum information size of all A-MAP IE is determined as 56 bits, the rest of bits may be padded with reserved bits or padding bits.

And, the CRC of the CDMA Allocation A-MAP IE according to the $1^{st}$ embodiment of the present invention may be masked with an index of a code transmitted by a terminal and a RAID generated in accordance with a resource that carries the code.

In the following description, CDMA Allocation A-MAP IE according to a $2^{nd}$ embodiment of the present invention is explained.

First of all, CDMA Allocation A-MAP IE according to a $2^{nd}$ embodiment of the present invention may include UL allocation information on at least two BR or ranging codes received by a base station.

Table 3 shows a format of CDMA Allocation A-MAP IE according to a $2^{nd}$ embodiment of the present invention.

TABLE 3

| Fields | Bit size (Example) |
|---|---|
| ACK A-MAP IE( ) { | |
| A-MAP Type | 4 |
| if MCRC is masked with RAID and masking indicator for BR { | |
| Resource offset | 7 |
| BR code index 1 | 5 |
| Resource size for the code index 1 (Allocation size) | 0~5 |
| MCS for the code index 1 | 2~4 |
| HFA for the code index 1 | 0~4 |
| ACID for the code index 1 | 0~3 |
| Long TTI for the code index 1 | |
| Allocation relevance for the code index 1 | |
| ... | |
| BR code index n | 5 |
| Resource size for the code index n (Allocation size) | 0~5 |
| MCS for the code index n | 2~4 |
| HFA for the code index n | 0~4 |
| ACID for the code index n | 0~3 |
| Long TTI for the code index n | 0~1 |
| Allocation relevance for the code index n | 0~2 |
| } | |

Referring to Table 3, if CDMA Allocation A-MAP IE according to a $2^{nd}$ embodiment of the present invention is CDMA Allocation A-MAP IE for BR code, it may include Resource offset field, BR code index field for each of a plurality of BR codes, Resource size field for each of a plurality of BR codes, MCS field for each of a plurality of BR codes, HFA field for each of a plurality of BR codes, ACID field for each of a plurality of BR codes, long TTI indicator field for each of a plurality of BR codes, and Allocation relevance field for each of a plurality of BR code.

If CDMA Allocation A-MAP IE according to a $2^{nd}$ embodiment of the present invention is CDMA Allocation A-MAP IE for a ranging code, it may include Resource offset filed, Ranging code index field for each of a plurality of ranging codes, Resource size field for each of a plurality of ranging codes, MCS field for each of a plurality of ranging codes, HFA field for each of a plurality of ranging codes, ACID field for each of a plurality of ranging codes, long TTI field for each of a plurality of ranging codes, and Allocation relevance field for each of a plurality of ranging codes.

If the CDMA Allocation A-MAP IE according to the $2^{nd}$ embodiment of the present invention is the CDMA Allocation A-MAP IE for BR code, since A-MAP Type field, MCRC field and Resource offset field include 4 bits, 16 bits and 7 bits, respectively, as shown in Table 3, the CDMA Allocation A-MAP IE may include minimum '27+7*n1' bits to maximum '27+21*n2' bits. Assuming that a maximum information size of all A-MAP IE is determined as 56 bits, the n1 and the n2 may have values set to 4 and 1, respectively. In particular, the CDMA Allocation A-MAP IE of the minimum type may include indexes of 4 BR codes and corresponding information.

If the CDMA Allocation A-MAP IE according to the $2^{nd}$ embodiment of the present invention is the CDMA Allocation A-MAP IE for a ranging code, since A-MAP Type field, MCRC field and Resource offset field include 4 bits, 16 bits and 7 bits, respectively, as shown in Table 3, the CDMA Allocation A-MAP IE may include minimum '27+7*n1' bits to maximum '27+23*n2' bits. Assuming that a maximum information size of all A-MAP IE is determined as 56 bits, the n1 and the n2 may have values set to 4 and 1, respectively. In particular, the CDMA Allocation A-MAP IE of the minimum type may include indexes of 4 ranging codes and corresponding information.

And, the CRC of the CDMA Allocation A-MAP IE according to the $2^{nd}$ embodiment of the present invention may be masked with a RAID generated in accordance with an index of a resource that carries a code transmitted by a terminal.

Even if each of the CDMA Allocation A-MAP IE according to the $1^{st}$ embodiment of the present invention and the CDMA Allocation A-MAP IE according to the $2^{nd}$ embodiment of the present invention includes the same field, the field may differ in size. In order to support both of the CDMA Allocation A-MAP IE according to the $1^{st}$ embodiment of the present invention and the CDMA Allocation A-MAP IE according to the $2^{nd}$ embodiment of the present invention, an extended A-MAP type field may be added into A-MAP IE.

In the following description, CDMA Allocation A-MAP IE according to a $3^{rd}$ embodiment of the present invention is explained.

First of all, CDMA Allocation A-MAP IE according to a $3^{rd}$ embodiment of the present invention may include a field indicating whether the CDMA Allocation A-MAP IE is provided to allocate a resource for a bandwidth request or a resource for a ranging.

Table 4 shows one example of a format of CDMA Allocation A-MAP IE according to a $3^{rd}$ embodiment of the present invention.

TABLE 4

| Syntax | Size (bits) | Notes |
|---|---|---|
| CDMA_Allocation_A-MAP IE( ) { | — | |

TABLE 4-continued

| Syntax | Size (bits) | Notes |
|---|---|---|
| A-MAP IE Type | 4 | |
| Allocation Type | 2 | 0b00: unsynchronized ranging, 0b01: synchronized ranging, 0b10: BWREQ, 0b11: resved |
| If Allocation Type=10{ | | |
| Resource assignment Information | TBD | Information for Resource Index and Long TTI Indicator |
| HFA | 4 | HARQ Feedback Allocation |
| Power Level Adjust | 4 | Relative change in transmission power level. Signed in units of 1 dB |
| Reserved | TBD | |
| } | | |
| Else if Allocation Type=00 { | | |
| Resource assignment Information | TBD | Information for Resource Index, Long TTI Indicator and Isizeoffset |
| HFA | 4 | HARQ Feedback Allocation. If needs, ACID should be also included. |
| Reserved | TBD | |
| } | | |
| MCRC | 16 | CRC masked by 12-bit RA-ID |
| } | | |

Referring to Table 4, CDMA Allocation A-MAP IE according to a $3^{rd}$ embodiment of the present invention may include Allocation Type field. The Allocation Type field may indicate whether the CDMA Allocation A-MAP IE is provided to allocate a resource for a bandwidth request or a resource for a ranging. The Allocation Type field may include 2 bits. If the Allocation Type field is set to 0b00, it may indicate that the CDMA Allocation A-MAP IE may relate to an unsynchronized ranging. If the Allocation Type field is set to 0b01, it may indicate that the CDMA Allocation A-MAP IE may relate to a synchronized ranging. If the Allocation Type field is set to 0b10, it may indicate that the CDMA Allocation A-MAP IE may relate to a bandwidth request. An initial ranging or a handover ranging corresponds to the unsynchronized ranging. And, a periodic ranging corresponds to the synchronized ranging.

Table 5 shows another example of a format of CDMA Allocation A-MAP IE according to a $3^{rd}$ embodiment of the present invention.

TABLE 5

| Syntax | Size (bits) | Notes |
|---|---|---|
| CDMA_Allocation_A-MAP IE( ) { | — | |
| A-MAP IE Type | 4 | |
| Allocation Type | 1 | 0: unsynchronized ranging, 1: synchronized ranging/BWREQ |
| If Allocation Type=1 { | | |
| Type | 1 | 0: BWREQ, 1: synchronized ranging |
| If Type=0{ | | |
| Resource assignment Information | TBD | Information for Resource Index and Long TTI Indicator |
| HFA | 4 | HARQ Feedback Allocation |
| Power Level Adjust | 4 | Relative change in transmission power level. Signed in units of 1 dB |
| Reserved | TBD | |
| } | | |
| Else if Allocation Type=0 { | | |
| Resource assignment Information | TBD | Information for Resource Index, Long TTI Indicator and $I_{sizeoffset}$ |
| HFA | 4 | HARQ Feedback Allocation. If needs, ACID should be also included. |
| Reserved | TBD | |
| } | | |
| MCRC | 16 | CRC masked by 12-bit RA-ID |
| } | | |

Referring to Table 5, CDMA Allocation A-MAP IE according to a $3^{rd}$ embodiment of the present invention may include 1-bit Allocation Type field. If the Allocation Type field is set to 1, a-bit Type field may be included. In particular, if the Allocation Type field is set to 0, it may indicate that the CDMA Allocation A-MAP IE relates to an unsynchronized ranging. If the Allocation Type field is set to 1, it may indicate that the CDMA Allocation A-MAP IE relates to a synchronized ranging or a bandwidth request. If the Allocation Type field is set to 1, 1-bit Type field may be included. If the Type field is set to 0, it may indicate that the CDMA Allocation A-MAP IE relates to a bandwidth request. If the Type field is set to 1, it may indicate that the CDMA Allocation A-MAP IE relates to a synchronized ranging.

In the following description, CDMA Allocation A-MAP IE according to a $4^{th}$ embodiment of the present invention is explained.

A $4^{th}$ embodiment of the present invention may propose CDMA Allocation A-MAP IE that is usable in case of allocating a DL resource for a ranging response (hereinafter abbreviated RNG-RSP) message transmission as well as a UL resource.

First of all, a base station informs a terminal of a DL resource to carry RNG-RSP message using A-MAP IE.

In doing so, the base station may use a DL basic assignment IE used for a previously defined DL allocation, CDMA Allocation A-MAP IE used for a previously defined UL allocation, or a new A-MAP IE newly designed.

In case of using CDMA Allocation A-MAP IE used for a previously defined UL allocation, it may need a field to indicate whether CDMA Allocation A-MAP IE is provided for a UL resource allocation or a DL resource allocation. If so, a terminal may check a value of the indication field and be aware whether the CDMA Allocation A-MAP IE relates to a ranging request (hereinafter abbreviated RNG-REQ) message or an RNG-RSP message.

If the CDMA Allocation A-MAP IE is provided for the DL resource allocation, it may add a field to indicate whether the CDMA Allocation A-MAP IE is provided for an initial ranging, a handover ranging or a periodic ranging or use a masking indicator to identify a usage of the CDMA Allocation A-MAP IE.

And, CRC of A-MAP IE to indicate a DL resource for carrying the RNG-RSP message may be masked with RAID or STID.

In case that the CRC is masked with the RAID, when a DL basic allocation A-MAP IE is used, a terminal may be able to recognize whether the DL basic allocation A-MAP IE is provided for a general terminal or a terminal having attempted a ranging, using a masking indicator. And, it may be able to indicate that the DL basic allocation A-MAP IE is for the terminal having attempted the ranging using a type field in A-MAP.

The terminal checks whether the CRC of the received A-MAP IE is its CRC using its RAID and a corresponding masking indicator. If the CRC is the CRC of its own, the terminal checks the rest of the fields of the A-MAP IE and then decodes a region for delivering DL data.

In case of masking the CRC of the A-MAP IE with the STID, the CRC is masked using STID for a previously-defined ranging usage.

In doing so, it may be able to mask the CRC by the same method for all rangings (initial/handover/periodic) or apply a different method in accordance with a ranging. For instance, CRC of CDMA Allocation A-MAP IE for an initial ranging or a handover ranging is masked with RAID. And, CRC of CDMA Allocation A-MAP IE for a periodic ranging is masked with STID. By applying this method, it may be able to lower detection error probability.

Figure 2:
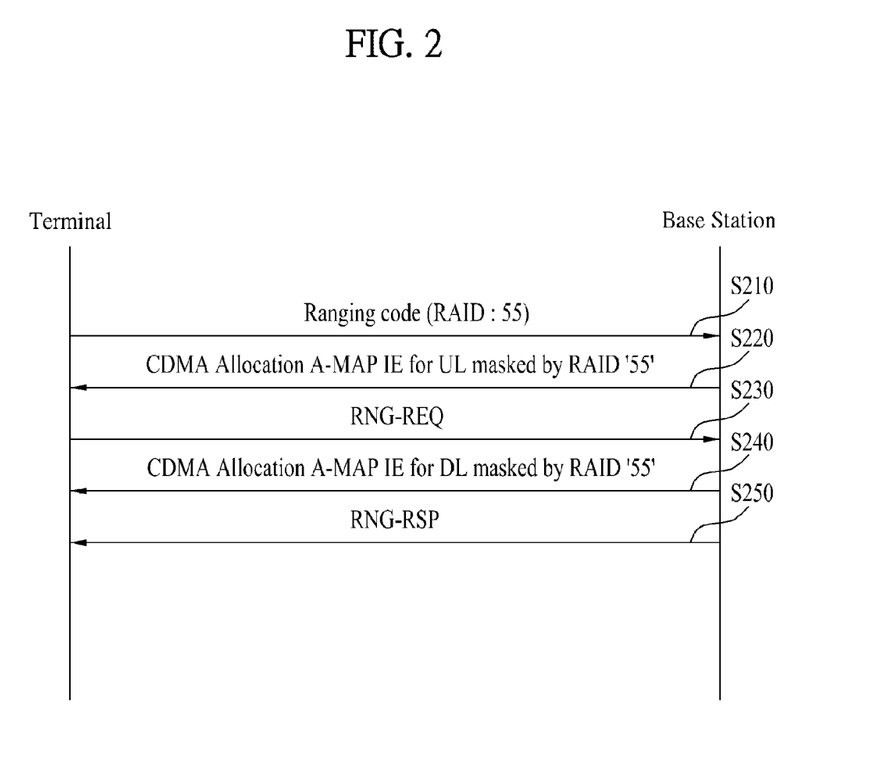
FIG. 2 is a diagram for a ranging procedure using CDMA Allocation A-MAP IE proposed by a $4^{th}$ embodiment of the present invention.

Table 6 shows a format of CDMA Allocation A-MAP IE according to a 4$^{th}$ embodiment of the present invention.

base station allocates a UL resource to the terminal using CDMA Allocation A-MAP IE [S220]. In this case, if an RAID determined in accordance with the ranging code transmitted by the terminal and a resource having carried the ranging code is set to 55, CRC of the CDMA Allocation A-MAP IE is masked with 55 and a masking indicator.

The terminal sends an RNG-REQ message to the base station via the allocated UL resource [S230]. Having received the RNG-REQ message, the base station allocated a DL resource for carrying an RNG-RSP message to the terminal via the CDMA Allocation A-MAP IE [S240]. In doing so, CRC of the CDMA Allocation A-MAP IE is masked with 55 and a masking indicator.

Subsequently, the base station sends the RNG-RSP message to the terminal via the allocated DL resource [S250].

TABLE 6

| Syntax | Size (bits) | Notes |
| --- | --- | --- |
| CDMA_Allocation_A-MAP IE( ) { | — | |
| A-MAP IE type | 4 | CDMA Allocation A-MAP IE |
| Allocation Type | 1 | 0: ranging, 1: BWREQ |
| If Allocation Type=1 { | | |
| Resource Index | 11 | 5 MHz: 0 in first 2 MSB bits + 9 bits for resource index |
| | | 10 MHz: 11 bits for resource index |
| | | 20 MHz: 11 bits for resource index |
| | | Resource index includes location and allocation size. |
| Long TTI Indicator | 1 | Indicates number of AAI subframes spanned by the allocated resource. |
| | | 0b0: 1 AAI subframe (default) |
| | | 0b1: 4 UL AAI subframes for FDD or all UL AAI subframes for TDD |
| | | If number of DL AAI subframes, D, is less than number of UL AAI subframes, U, Long TTI Indicator = 0b1 |
| HFA | 3 | HARQ Feedback Allocation |
| Power Level Adjust | 4 | Relative change in transmission power level. Signed in units of 1 dB |
| } | | |
| If Allocation Type=0{ | | |
| Uplink/Downlink Indicator | 1 | Indicates whether the following fields are for resource assignment in the uplink or in the downlink. |
| | | 0b0: Uplink 0b1: Downlink |
| Resource Index | 11 | 5 MHz: 0 in first 2 MSB bits + 9 bits for resource index |
| | | 10 MHz: 11 bits for resource index |
| | | 20 MHz: 11 bits for resource index |
| | | Resource index includes location and allocation size. |
| Long TTI Indicator | 1 | Indicates number of AAI subframes spanned by the allocated resource. |
| | | 0b0: 1 AAI subframe (default) |
| | | 0b1: 4 UL AAI subframes for FDD or all UL AAI subframes for TDD |
| | | If number of DL AAI subframes, D, is less than number of UL AAI subframes, U, Long TTI Indicator = 0b1 |
| $I_{SizeOffset}$ | 5 | Offset used to compute burst size index |
| HFA | 3 | HARQ Feedback Allocation |
| } | | |
| Padding | variable | Padding to reach byte boundary |
| MCRC | 16 | CRC masked by RA-ID and Masking Indicator |
| } | — | |

Referring to Table 6, CDMA Allocation A-MAP IE according to a 4$^{th}$ embodiment of the present invention may include an uplink/downlink (UL/DL) indicator field indicating whether CDMA Allocation A-MAP IE is provided for a UL resource allocation or a DL resource allocation. And, CRC may be masked with an RAID and a masking indicator. In this case, the RAID may be determined in accordance with a ranging code transmitted by a terminal and a resource having carried the ranging code.

In the following description, a ranging procedure using CDMA Allocation A-MAP IE according to a 4$^{th}$ embodiment of the present invention is explained with reference to FIG. 2.

FIG. 2 is a diagram for a ranging procedure using CDMA Allocation A-MAP IE proposed by a 4$^{th}$ embodiment of the present invention.

Figure 3:
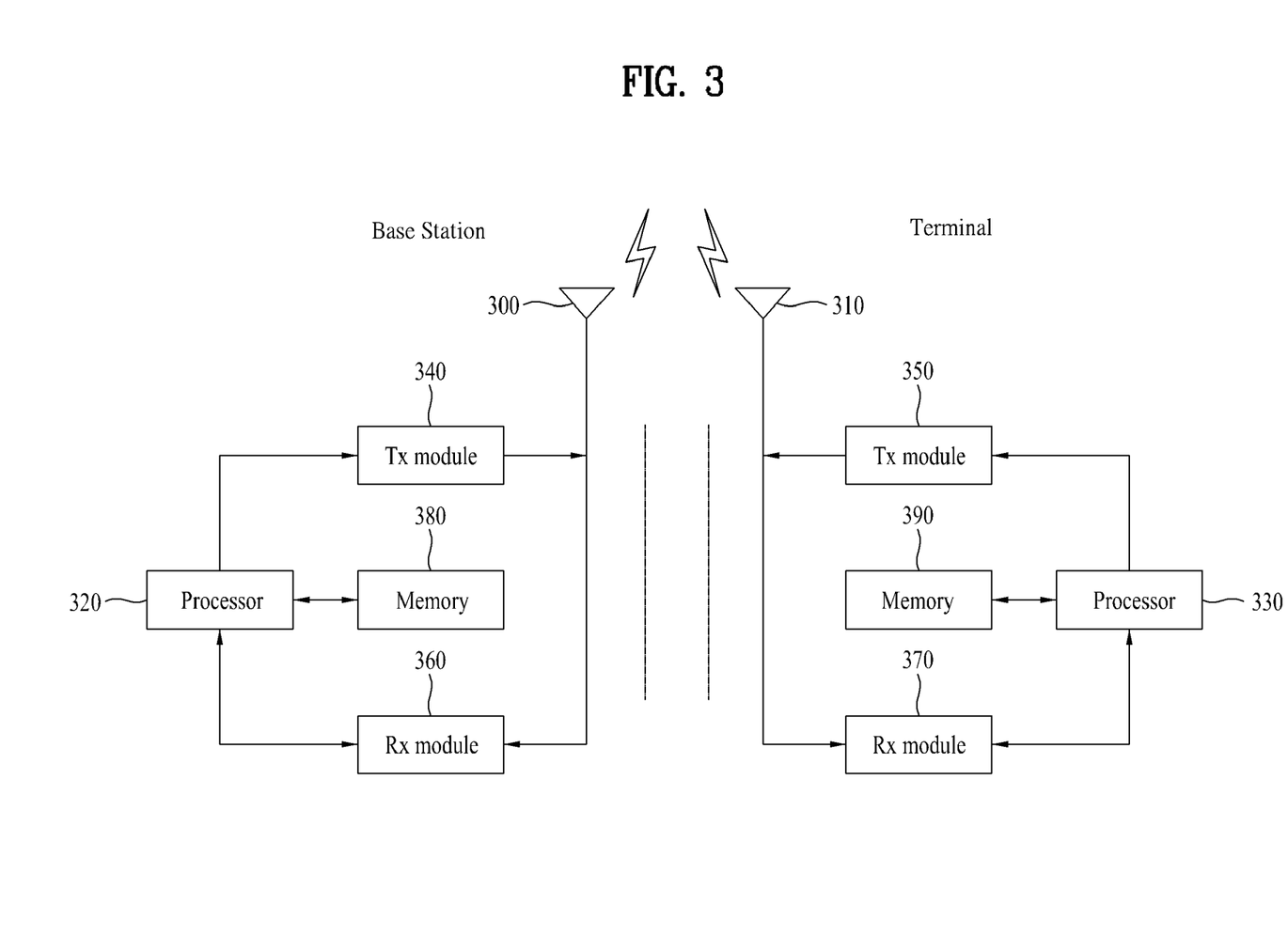
FIG. 3 is a diagram for configurations of a terminal and a base station to implement embodiments of the present invention.

Referring to FIG. 2, a terminal transmits a ranging code to a base station [S210]. Having received the ranging code, the FIG. 3 shows another embodiment of the present invention. In particular, FIG. 3 is a diagram for configurations of a terminal and a base station to implement embodiments of the present invention.

Referring to FIG. 3, a terminal/base station (AMS/ABS) includes an antenna 300/310 capable of transmitting and receiving information, data, signals and/or messages and the like, a transmitting module (Tx module) 340/350 transmitting a message by controlling the antenna, a receiving module (Rx module) 360/370 receiving a message by controlling the antenna, a memory 380/390 storing informations associated with communications with a base station, and a processor 320/330 controlling the transmitting module, the receiving module and the memory. In this case, the base station may include a femto base station or a macro base station.

The antenna 300/310 externally transmits a signal generated from the transmitting module 340/350. And, the antenna 300/310 receives a radio signal from outside and then delivers the received radio signal to the receiving module 360/370. In case that a multiple-antenna (MIMO) function is supported, at least two antennas may be provided.

The processor 320/330 generally controls overall operations of the mobile/base station. In particular, the processor may be able to perform a control function for performing the above-described embodiments of the present invention, a MAC (medium access control) frame variable control function according to service characteristics and propagation environment, a handover function, an authentication function, an encryption function and the like. And, the processor 320/330 may further include an encryption module configured to control encryptions of various messages and a timer module configured to control transmissions and receptions of the various messages.

The transmitting module 340/350 performs prescribed coding and modulation on a signal and/or data, which is scheduled by the processor and will be then transmitted externally, and may deliver the coded and modulated signal and/or data to the antenna 300/310.

The transmitting module 350 of the terminal transmits a ranging code or a BR code to the base station. The transmitting module 340 of the base station transmits CDMA Allocation A-MAP IE including a field indicating whether a resource for a bandwidth request or a resource for a ranging will be allocated to the terminal.

After the base station has received the ranging code from the terminal, if the base station allocates the resource for the ranging via the CDMA Allocation A-MAP IE, the CDMA Allocation A-MAP IE may further include a field indicting whether to allocate a UL resource or a DL resource.

In case that the CDMA Allocation A-MAP IE allocates the resource for the bandwidth request, it may not include a field indicating an offset used to calculate a burst size. In case that the CDMA Allocation A-MAP IE allocates the resource for the ranging, it may include the field indicating the offset.

The receiving module 360/370 reconstructs the radio signal received externally via the antenna 300/310 into original data in a manner of performing decoding and demodulation on the received radio signal and may be then able to deliver the reconstructed original data to the processor 320/330.

The receiving module 360 of the base station receives the ranging code or the BR code from the terminal. The receiving module 370 of the terminal receives CDMA Allocation A-MAP IE including a field indicating whether to allocate a resource for a bandwidth request or a resource for a ranging from the base station.

The memory 380/390 may store programs for processing and control of the processor and is able to perform a function of temporarily storing input/output data (e.g., in case of the terminal, UL grant allocated by the base station, system information, station identifier (STID), a flow identifier (FID), an action time, region allocation information, frame offset information, etc.).

And, the memory 380/390 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

What is claimed is:

1. A method for transmitting resource allocation information, at a base station in a random access process in a wireless communication system, the method comprising:
   receiving a code from a terminal; and
   transmitting the resource allocation information through a CDMA (code division multiple access) Allocation A-MAP (Advanced-MAP) IE (information element) including a first field indicating whether the resource allocation information is for a bandwidth request or a ranging procedure to the terminal,
   wherein, if the first field indicates the resource allocation information is for the ranging procedure, the CDMA Allocation A-MAP IE further includes a second field indicating whether a resource for the ranging procedure is allocated in an uplink or a downlink.

2. The method of claim 1, wherein, if the first field indicates the resource allocation information is for the bandwidth request, the CDMA Allocation A-MAP IE does not include a third field indicating an offset used to calculate a burst size, and
   wherein, if the first field indicates the resource allocation information is for the ranging procedure, the CDMA Allocation A-MAP IE includes the third field indicating the offset.

3. The method of claim 1, wherein the CDMA Allocation A-MAP IE further includes a fourth field indicating the number of subframes across which the allocated resource is distributed.

4. The method of claim 1, wherein the CDMA Allocation A-MAP IE includes a CRC masked with an RAID and a masking indicator and wherein the RAID is determined in accordance with an index of the code and a resource having carried the code.

5. A method for receiving resource allocation information at a terminal in a random access process in a wireless communication system, the method comprising:
   transmitting a code to a base station; and
   receiving the resource allocation information through a CDMA (code division multiple access) Allocation A-MAP (Advanced-MAP) IE (information element) including a first field indicating whether the resource allocation information is for a bandwidth request or a ranging procedure from the base station,
   wherein, if the first field indicates the resource allocation information is for the ranging procedure, the CDMA Allocation A-MAP IE further includes a second field indicating whether a resource for the ranging procedure is allocated in an uplink or a downlink.

6. The method of claim 5, wherein, if the first field indicates the resource allocation information is for the bandwidth request, the CDMA Allocation A-MAP IE does not include a third field indicating an offset used to calculate a burst, size, and wherein, if the first field indicates the resource allocation information is for the ranging procedure, the CDMA Allocation A-MAP IE includes the third field indicating the offset.

7. The method of claim 5, wherein the CDMA Allocation A-MAP IE further includes a fourth field indicating the number of subframes across which the allocated resource is distributed.

8. The method of claim 5, wherein the CDMA Allocation A-MAP IE includes a CRC masked with an RAID and a masking indicator and wherein the RAID is determined in accordance with an index of the code and a resource having carried the code.

9. A base station comprising:
a receiving module configured to receive a code from a terminal attempting a random access; and
a transmitting module configured to transmit resource allocation information through a CDMA (code division multiple access) Allocation A-MAP (Advanced-MAP) IE (information element) including a first field indicating whether the resource allocation information is for a bandwidth request or a ranging procedure to the terminal,
wherein, if the first field indicates the resource allocation information is for the ranging procedure, the CDMA Allocation A-MAP IE further includes a second field indicating whether a resource for the ranging procedure is allocated in an uplink or a downlink.

10. The base station of claim 9, wherein, if the first field indicates the resource allocation information is for the bandwidth request, the CDMA Allocation A-MAP IE does not include a third field indicating an offset used to calculate a burst, size, and wherein, if the first field indicates the resource allocation information is for the ranging procedure, the CDMA Allocation A-MAP IE includes the third field indicating the offset.

11. The base station of claim 9, wherein the CDMA Allocation A-MAP IE further includes a fourth field indicating the number of subframes across which the allocated resource is distributed.

12. The base station of claim 9, wherein the CDMA Allocation A-MAP IE includes a CRC masked with an RAID and a masking indicator and wherein the RAID is determined in accordance with an index of the code and a resource having carried the code.

13. A terminal comprising:
a transmitting module configured to transit a code to a base station to attempt a random access; and
a receiving module configured to receive resource allocation information through a CDMA (code division multiple access) Allocation A-MAP (Advanced-MAP) IE (information element) including a first field indicating whether the resource allocation information is for a bandwidth request or a ranging procedure from the base station,
wherein, if the first field indicates the resource allocation information is for the ranging procedure, the CDMA Allocation A-MAP IE further includes a second field indicating whether a resource for the ranging procedure is allocated in an uplink or a downlink.

14. The terminal of claim 13, wherein, if the first field indicates the resource allocation information is for the bandwidth request, the CDMA Allocation A-MAP IE does not include a third field indicating an offset used to calculate a burst size, and
wherein, if the first field indicates the resource allocation information is for the ranging procedure, CDMA Allocation A-MAP IE includes the third field indicating the offset.

15. The terminal of claim 13, wherein the CDMA Allocation A-MAP IE further includes a fourth field indicating the number of subframes across which the allocated resource is distributed.

16. The terminal of claim 13, wherein the CDMA Allocation A-MAP IE includes a CRC masked with an RAID and a masking indicator and wherein the RAID is determined in accordance with an index of the code and a resource having carried the code.

* * * * *